United States Patent
Anezaki et al.

[11] Patent Number: 5,320,876
[45] Date of Patent: Jun. 14, 1994

[54] TRANSFER APPARATUS AND METHOD

[75] Inventors: Yoshikazu Anezaki; Koji Sasaki, both of Miyagi; Hidetoshi Watanabe, Ibaragi; Hirotsugu Suzuki, Chiba, all of Japan

[73] Assignee: Sony Corporation, Tokyo, Japan

[21] Appl. No.: 761,901

[22] PCT Filed: Jan. 29, 1991

[86] PCT No.: PCT/JP91/00098
§ 371 Date: Sep. 11, 1991
§ 102(e) Date: Sep. 11, 1991

[87] PCT Pub. No.: WO91/11805
PCT Pub. Date: Aug. 8, 1991

[30] Foreign Application Priority Data
Jan. 31, 1990 [JP] Japan ................... 2-018832

[51] Int. Cl.$^5$ .................................. B05D 3/06
[52] U.S. Cl. ......................... 427/510; 427/162;
427/164; 427/277; 427/355; 118/641; 118/101;
118/102; 118/121
[58] Field of Search ............ 427/164, 277, 264, 278,
427/510, 162, 355; 118/101, 641, 102, 121

[56] References Cited
U.S. PATENT DOCUMENTS 4,353,949 10/1982 Kyminas et al. ............. 427/277 X
5,053,252 10/1991 Kimura et al. .................. 427/164

FOREIGN PATENT DOCUMENTS

0130900A1 1/1985 European Pat. Off. .
1226391 6/1960 France .
63244429 10/1963 Japan .
149502 8/1920 United Kingdom .

OTHER PUBLICATIONS

Patent Abstracts of Japan, vol. 4, No. 143 (M-35) Oct. 8, 1980 & JP-A-55 097 929 (Matsushita Electric Ind Co), Jul. 25, 1980.
Patent Abstracts of Japan, vol. 6, No. 56 (M-121), Apr. 13, 1982 & JP-A-56 167 422 (Toppan Printing Co.), Dec. 23, 1981.
Patent Abstracts of Japan, vol. 8, No. 146 (M-307), & Jul. 1984 & JP-A-59 042 934 (Tokyo Shibauru Denki KK), Mar. 9, 1984.
Patent Abstracts of Japan, vol. 8, No. 16 (M-270) Jan. 24, 1984 & JP-A-58 177 327 (Matsushita Denki Sangyo KK), Oct. 18, 1983.

Primary Examiner—Janyce Bell
Attorney, Agent, or Firm—Philip M. Shaw, Jr.

[57] ABSTRACT

According to the present, invention, when transferring a pattern of projections and valleys of a stamper to a UV curable resin coated on a disc base plate, the disc base plate is pressed against the stamper while the stamper is maintained at a constant temperature to set the viscosity of the UV curable resin to a value suitable for transferring the pattern of projections and valleys to the UV curable resin from the stamper to realize high fidelity duplication.

7 Claims, 11 Drawing Sheets

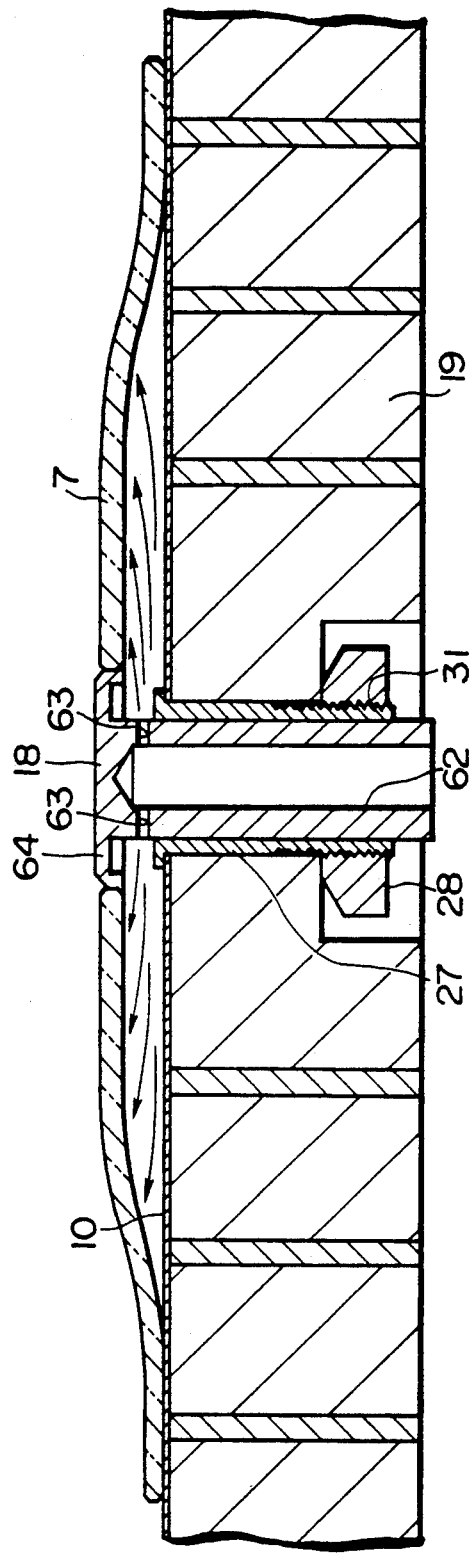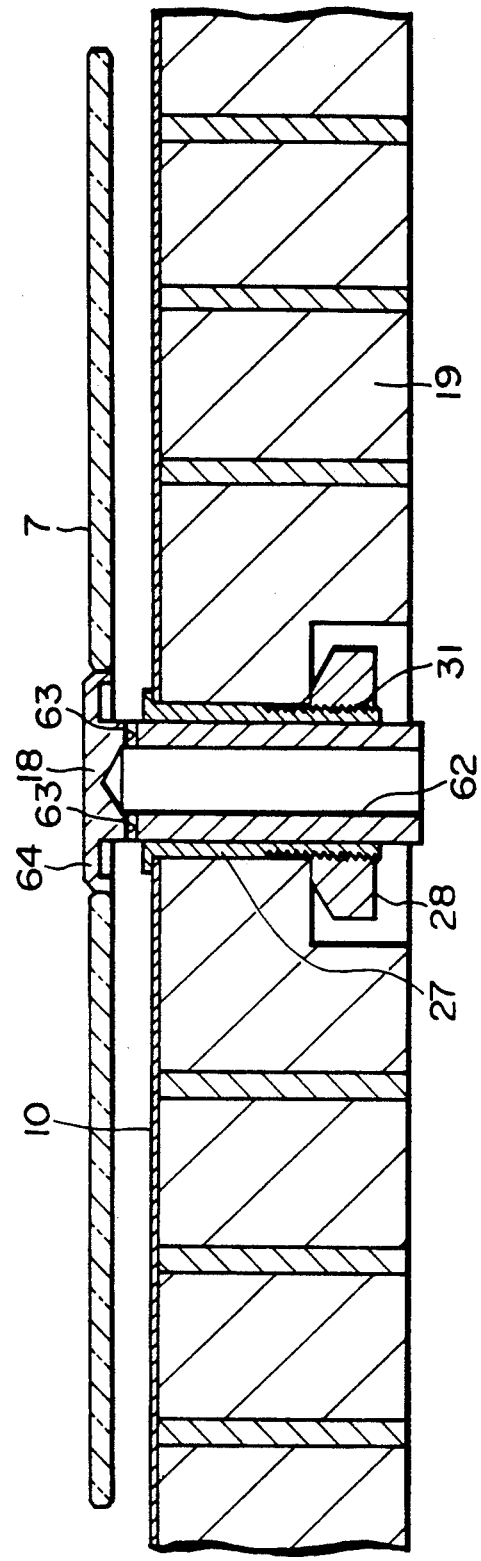

TRANSFER APPARATUS AND METHOD

TECHNICAL FIELD

This invention relates to a transfer apparatus and a transfer method for transferring a pattern of projections and valleys of a stamper to a UV curable resin applied on a disc base plate.

BACKGROUND ART

Heretofore, as a technique of duplicating a disc base plate of an optical disc, a magneto-optical disc etc., there is proposed a photopolymer method, a so-called 2P method, which makes use of, for example, a synthetic resin curable on irradiation of UV rays (UV curable resin).

With the 2P method, a liquid UV curable resin is applied on the surface of a disc base plate, such as by screen printing, the disc base plate is placed on a stamper so that the UV curable resin is brought into intimate contact with the stamper, the disc base plate is pressed against the stamper by a roll, the UV curable resin is cured by irradiation of UV rays and the disc base plate is peeled from the stamper simultaneously with a cured resin layer for transferring the pattern of fine projections and valleys (grooves or pits) produced on the stamper surface.

The 2P method has an advantage that, by using the liquid resin, duplication may be made faithfully without stamper deterioration and, if a glass base plate is used as a base plate, a disc base plate may be obtained which is excellent in dimensional stability and thermal resistance and low in birefringence.

For duplicating the disc base plate by the above mentioned 2P method, an apparatus comprised of a stamper 101, on the surface of which a pattern of projections and valleys is formed, a rest block 102 for securing the stamper 101, and a centering pin 104 for peeling a disc base plate 103, on which the pattern of projections and valleys on the stamper 101 has been transferred by photocuring of the UV curable resin, from the stamper 101, as shown in FIG. 13.

The rest block 102 functions as a supporting block for securing the stamper 101 bearing a pattern of fine projections and valleys on its surface, and also for transferring the pattern to a UV curable resin layer, not shown, provided on the disc base plate 103. The block 102 has a through-hole 106, at a mid position thereof, through which a shank 105 of the centering pin 104 is introduced. The block 102 is supported on a base block 108 by means of support columns 107.

The centering pin 104 functions to secure the disc base plate 103 to a predetermined site on the stamper 101 and to peel off the disc base plate 103 from the stamper 101 simultaneously with the cured resin layer. Thus the centering pin 104 is comprised of a disc-shaped head 110 fitting into a centering hole 109 formed at a mid point of the disc base plate 103 for positioning and securing the disc base plate 103 at a predetermined position on the stamper 101 and a shank 105 which is slidable along the inner peripheral surface of the through-hole 106 of the rest block 102 as a guide.

The head 110 is of substantially the same shape as the centering hole 109 of the disc base plate 103, and is adapted to be engaged in the centering hole 109 from a side facing the stamper 101. On the other hand, the shank 105 is passed through the through-hole 106 and is connected at the lower end thereof to a pneumatic cylinder 111 provided on the base block 108 so as to be moved vertically along the inner peripheral surface of the through-hole 106 as a guide. That is, the lower end of the shank 105 fits in a recess 114 of a connecting member 113 attached to the distal end of a piston rod 112 projecting from the pneumatic cylinder 112, and is secured thereto by a bolt 115 for interconnecting the shank 105 and the pneumatic cylinder 111.

For duplicating the disc base plate with the use of the above described apparatus, the disc base plate 103 coated with the UV curable resin is placed on the stamper 101 secured to the rest block 102 so that the UV curable resin is in intimate contact with the stamper 101. At this time, the disc base plate 103 is secured at a predetermined position on the stamper 101 with a head 110 of the centering pin 104 fitting in the centering hole 109.

The disc base plate 103 is pressed by a roll, not shown, onto the stamper 101, for uniformly charging the liquid UV curable resin uniformly into a space between the stamper 101 and the disc base plate 103.

UV rays are then irradiated from the disc base plate side for curing the UV curable resin.

As a result, a disc base plate is produced, on the UV cured resin layer of which the pattern of the projections and valleys of the stamper 101 have been transferred.

Meanwhile, with the above mentioned 2P method, the viscosity of the UV curable resin plays a crucial role and a satisfactory transfer depends on the value of the viscosity. For example, as shown in FIG. 12, the UV curable resin is gradually increased in viscosity and lowered in fluidity as the temperature is lowered. Hence, if the disc base plate 103 coated with the UV curable resin is pressed against the stamper 101 secured on the rest block 102 maintained at an ambient temperature, the UV curable resin is increased in viscosity and becomes poor in fluidity so that the resin can not be intruded satisfactorily into interstices between the projections and valleys on the stamper. The result is that faithfulness of duplication is deteriorated. Thus the UV curable resin has a range of viscosity which is suited to transfer and which needs to be maintained by some means or other.

In view of the above described status of the prior art, it is an object of the present invention to provide a disc transfer method whereby the pattern of projections and valleys of the stamper may be transferred satisfactorily to a UV curable resin layer.

DISCLOSURE OF THE INVENTION

The transfer apparatus of the present invention comprises coating means for applying a UV curable resin on a disc base plate, holding means for holding a stamper on which a pattern of projections and valleys based on information signals is formed, tight pressing means for tightly pressing said disc base plate coated with said UV curable resin onto said stamper, and constant temperature maintaining means for maintaining said stamper at a constant temperature.

The transfer apparatus according to the present invention is characterized in that said constant temperature maintaining means is provided on said holding means and in that the UV curable resin applied by said coating means to said disc base plate is maintained by said constant temperature maintaining means at a viscosity suited to transfer the pattern of projections and valleys on said stamper.

The transfer apparatus according to the present invention is further characterized in that said constant temperature maintaining means is a circulating mechanism for circulating warm water.

The transfer method according to the present invention for transferring a pattern of projections and valleys on said stamper to a UV curable resin applied on a disc base plate comprises pressing said disc base plate coated with the UV curable resin to said stamper which is maintained at a constant temperature.

The transfer method according the present invention comprises maintaining said stamper at a constant temperature at which said UV curable resin is at a viscosity suitable for transferring the pattern of projections and valleys on said stamper to said UV curable resin.

With the transfer apparatus of the present invention, since constant temperature maintaining means is provided at holding means adapted for holding the stamper, the stamper is always warmed and maintained at a constant temperature.

Since the UV curable resin is maintained at a viscosity suitable for transferring the pattern of projections and valleys of the stamper by the constant temperature maintaining means, the UV curable resin is brought to a fluidized state to flow uniformly into interstices of the pattern of projections and valleys.

Also, since the constant temperature maintaining means is adapted for circulating warm water, the stamper is always maintained at a constant temperature under the heat of the warm water.

Thus, with the transfer apparatus of the present invention, the pattern of projections and val lays on the stamper may be transferred to the UV curable resin at a viscosity suitable for transferring the pattern of projections and valleys, so that high fidelity duplication may be achieved.

On the other hand, with the method of the present invention, since the disc base plate coated with the UV curable resin is pressed onto the stamper which is maintained at the constant temperature, the UV curable resin in tight contact with the stamper becomes fluid under the heat yielded from the stamper to be uniformly introduced into the interstices of the projections and recesses.

In addition, with the method of the present invention, since the stamper is maintained at a constant temperature so that the UV curable resin is maintained at a viscosity suitable for transferring the pattern of projections and recesses on the stamper, the UV curable resin in tight contact with the stamper is brought to a viscosity suitable for transfer under the heat yielded from the stamper and hence the resin may be intruded uniformly into the interstices of the pattern of projections and valleys on the stamper.

Thus, in accordance with the method of the present invention, the pattern of projections and valleys on the stamper may be satisfactorily transferred to the UV curable resin to enable production of high fidelity disc base plate.

BRIEF DESCRIPTION OF THE DRAWINGS

FIGS. 2, 3, 4, 5, 6, 7, 8, 9, 10 and 11 show a disc base plate transferring apparatus employed in the present embodiment, in which FIG. 2 is an exploded perspective view thereof; FIG. 3 is a plan view thereof FIG. 4 is a cross-sectional view thereof FIG. 5 is an enlarged exploded cross-sectional view showing essential portions thereof before the stamper is secured, FIG. 6 is a plan view of a holder, FIG. 7 is a cross-sectional view of the holder taken along line a—a of FIG. 6; FIG. 8 is an enlarged cross-sectional view showing essential portions thereof when the stamper is in secured state; FIG. 9 is an enlarged cross-sectional view showing essential portions thereof when the disc base plate is positioned; FIG. 10 is an enlarged cross-sectional view showing essential portions thereof when a gas is ejected for peeling the disc base plate; and FIG. 11 is an enlarged cross-sectional view showing essential portions thereof when the disc base plate has been peeled from the stamper.

BEST EMBODIMENT FOR PRACTICING THE INVENTION

Figure 1:
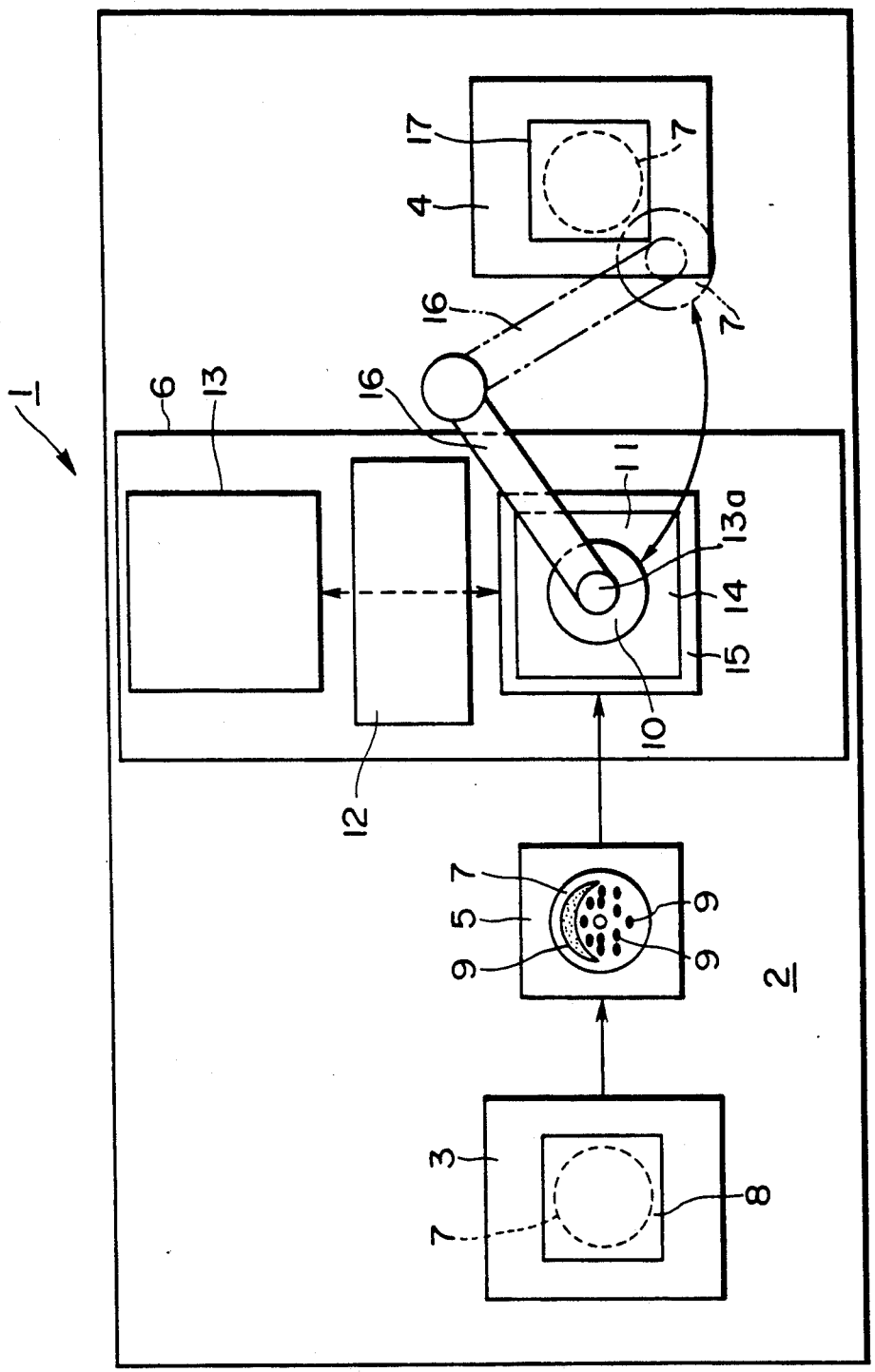
FIG. 1 is a schematic plan view for illustrating a series of steps for duplicating a disc base plate by the 2P method.

Before proceeding to description of an illustrative embodiment of the present invention, a series of process steps of duplicating a disc base plate by the 2P method will be briefly explained by referring to the drawings.

For duplicating the disc base plate by the 2P method, an apparatus for producing a disc base plate as shown for example in FIG. 1 is employed. The apparatus for producing a disc base plate is comprised of a disc base plate supply section 3 provided in the vicinity of one side edge on a base block 2, a disc base plate output section 4 provided in the vicinity of the other edge on the base block, an UV curable resin supply section 5 and a transfer section 6 provided in this order between the disc base plate supply section 3 and the disc base plate output section 4.

The disc base plate supply section 3 functions as a stock part for storing disc base plates 7, such as glass base plates, which will be supplied to the adjoining UV curable resin supply section 5. Thus the supply section 3 stores a plurality of disc base plates 7 within a cartridge 8.

The UV curable resin supply section 5 applies a liquid UV curable resin 9 on one surface of each disc base plate 7 taken out mechanically one by one from the cartridge 8 by a disc exchanging mechanism, not shown.

The transfer section 6 is comprised of a transfer unit 11 for placing a disc base plate 7 transported mechanically from the UV resin curable resin supply section 5 one by one by the disc exchanging mechanism, not shown, on a stamper 10, and shifting the disc base plate to a predetermined site, a pressing unit 12 for tightly pressing the disc base plate 7 onto the stamper 10 and a UV ray irradiating unit 13 for curing the UV curable resin positioned between the disc plate 7 and the stamper 10.

The transfer unit 11 is so constructed that, when the disc base plate 7 is placed on the stamper 10, a movable table 15 attached to a stamper unit 14 holding the stamper 10 is moved towards the UV ray irradiating unit 13. When the disc base plate 7 is thrust towards the stamper 10 by the pressing unit 12 provided between the stamper 10 and the unit 11, the disc base plate 7 is thrust by the pressing unit 12 towards the stamper 10. When the UV curable resin is cured by the UV ray irradiating unit 13, the movable table 15 is returned to the original position. At this time, the disc base plate 7 is peeled from the stamper 10 simultaneously with the UV cured resin layer.

The pressing unit 12 applies a pressure to the disc base plate 7 transported by the transfer unit 11 such as by a roll for uniformly charging the resin into a pattern of projections and valleys on the stamper 10.

On the other hand, the UV ray irradiating unit 13 irradiates the UV curable resin pressed by the pressing unit 12 with UV rays from the side of the disc base plate 7 for curing the UV curable resin.

The disc base outputting section 4 outputs the disc base plate 7, peeled from the stamper 10 by an exchange arm 16, so that the outputted disc base plate 7 is accommodated in an outputting hopper 17.

For producing a disc base plate with the use of the above mentioned disc base plate producing apparatus, the disc base plate 7 accommodated in t,.he cartridge 8 of the disc plate outputting section 3 is taken out by an exchange mechanism and transported to the UV curable resin supplying section 5.

The UV curable resin is applied at the UV curable resin supplying section 5 to one surface of the disc base plate 7.

The disc base plate 7 is transported by the exchange mechanism and placed on the stamper 10 of the transfer unit 10. At this time, the disc base plate 7 is placed so that the UV curable resin applied on the disc base plate 7 is brought into intimate contact with the stamper 10.

When the disc base plate 7 is placed on the stamper 10, the movable table 15 is shifted towards the UV ray irradiating unit and the disc base plate 7 is pressed against the stamper 10 by the intervening pressing unit 12.

The movable table 15 is then moved further forward to transport the disc base plate 7 to the UV ray irradiating unit 13 where UV rays are irradiated for curing the UV curable resin.

The movable table 15 is then returned to its original position and, by means of a centering pin, not shown, provided in the transfer unit 11, the disc base plate 7 is peeled off from the stamper 10 simultaneously with the UV cured resin layer.

The peeled disc base plate 7 is then accommodated in the transport cartridge of the disc base plate transporting section 4 by an exchanger arm 16.

In the above described process for duplicating the disc base plate, the present invention is particularly applied to the step at the transfer section 6 of apparatus for producing the disc base plate 1. Much of the remainder of the apparatus is the same as the conventional apparatus depicted in FIG. 1 and the same corresponding reference numerals have been used. An illustrative construction of the transfer unit 11 employed for practicing the method of the present invention will be hereinafter explained by referring to the drawings.

Figure 2:
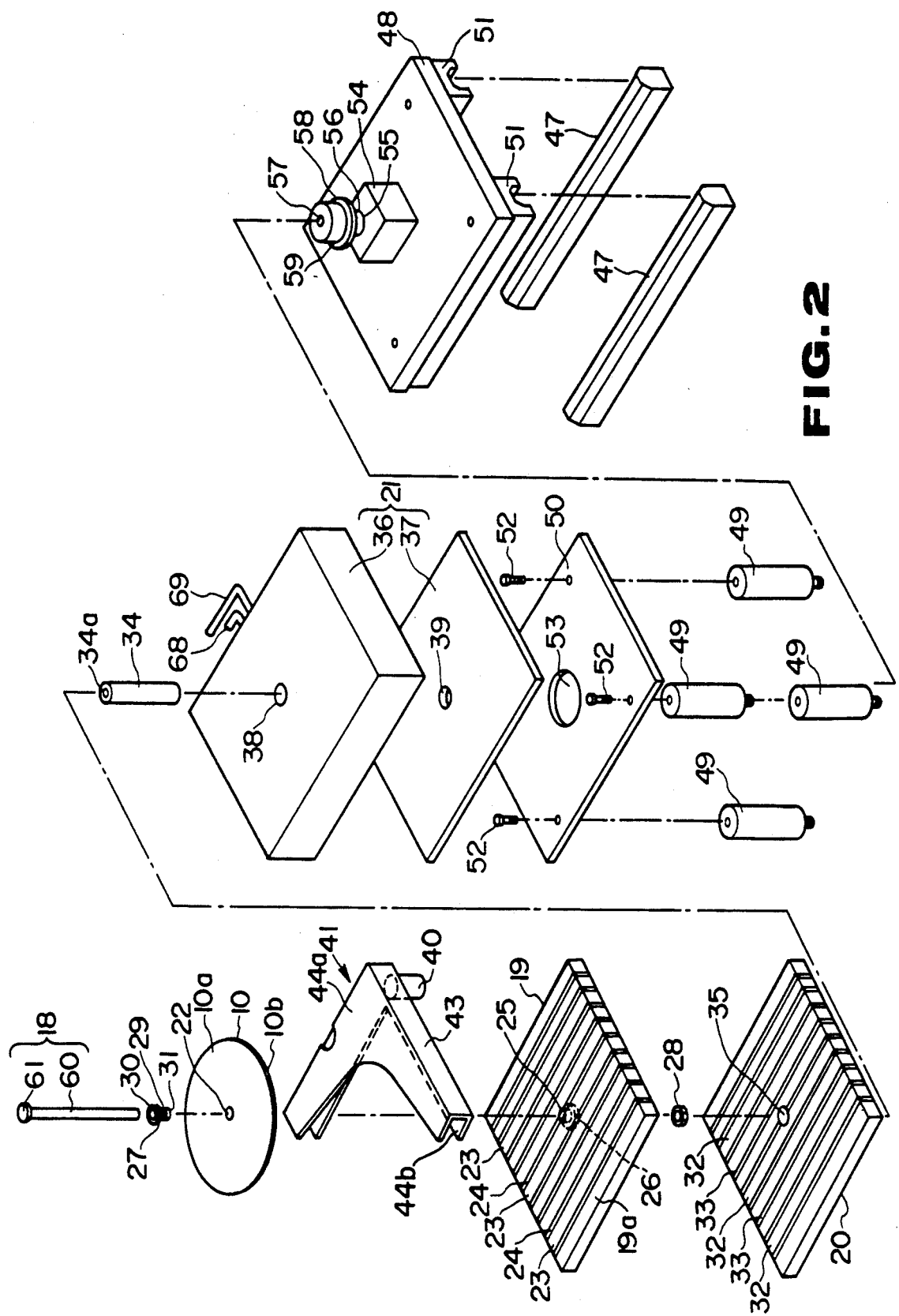
Figure 3:
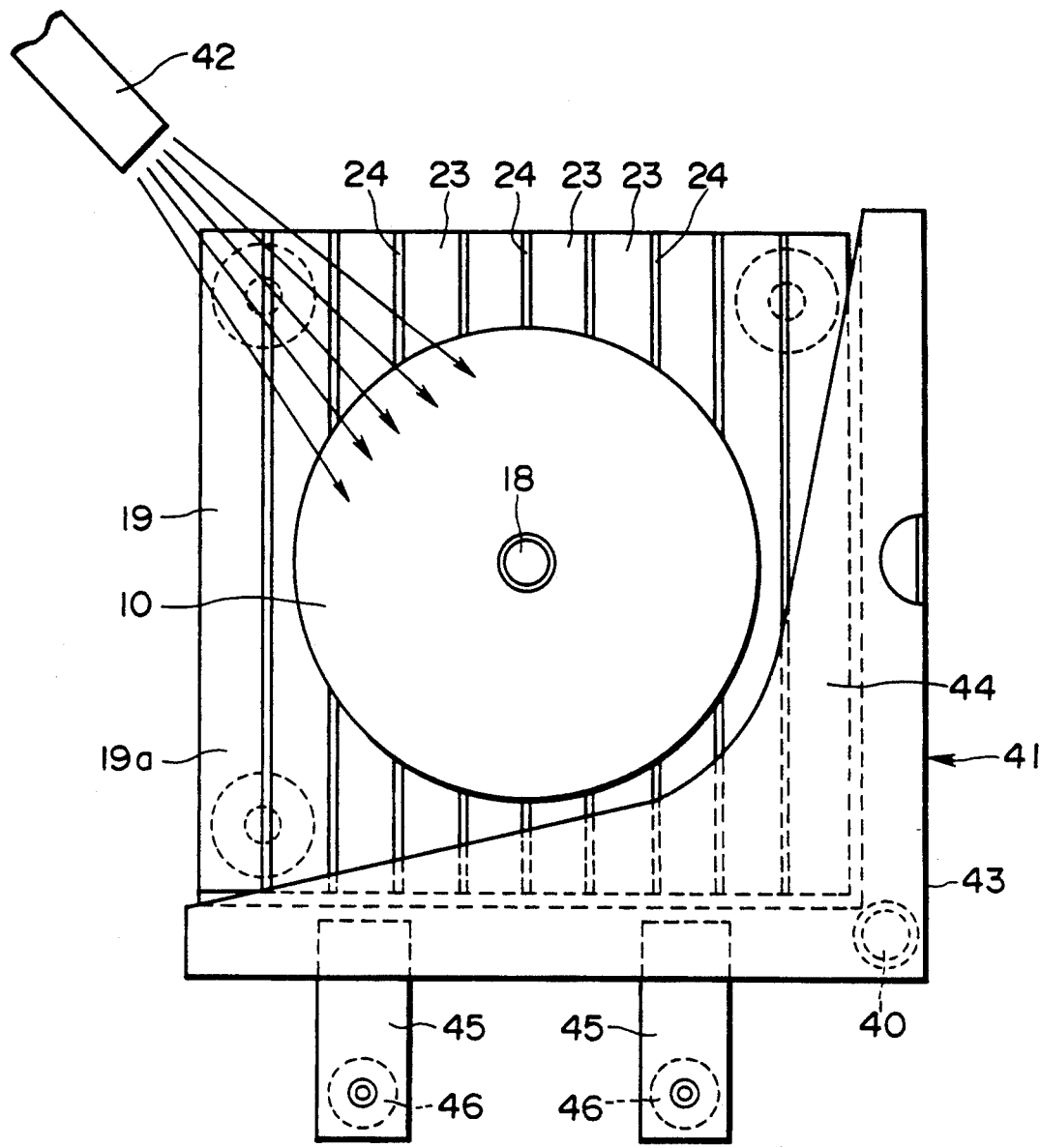
Figure 4:
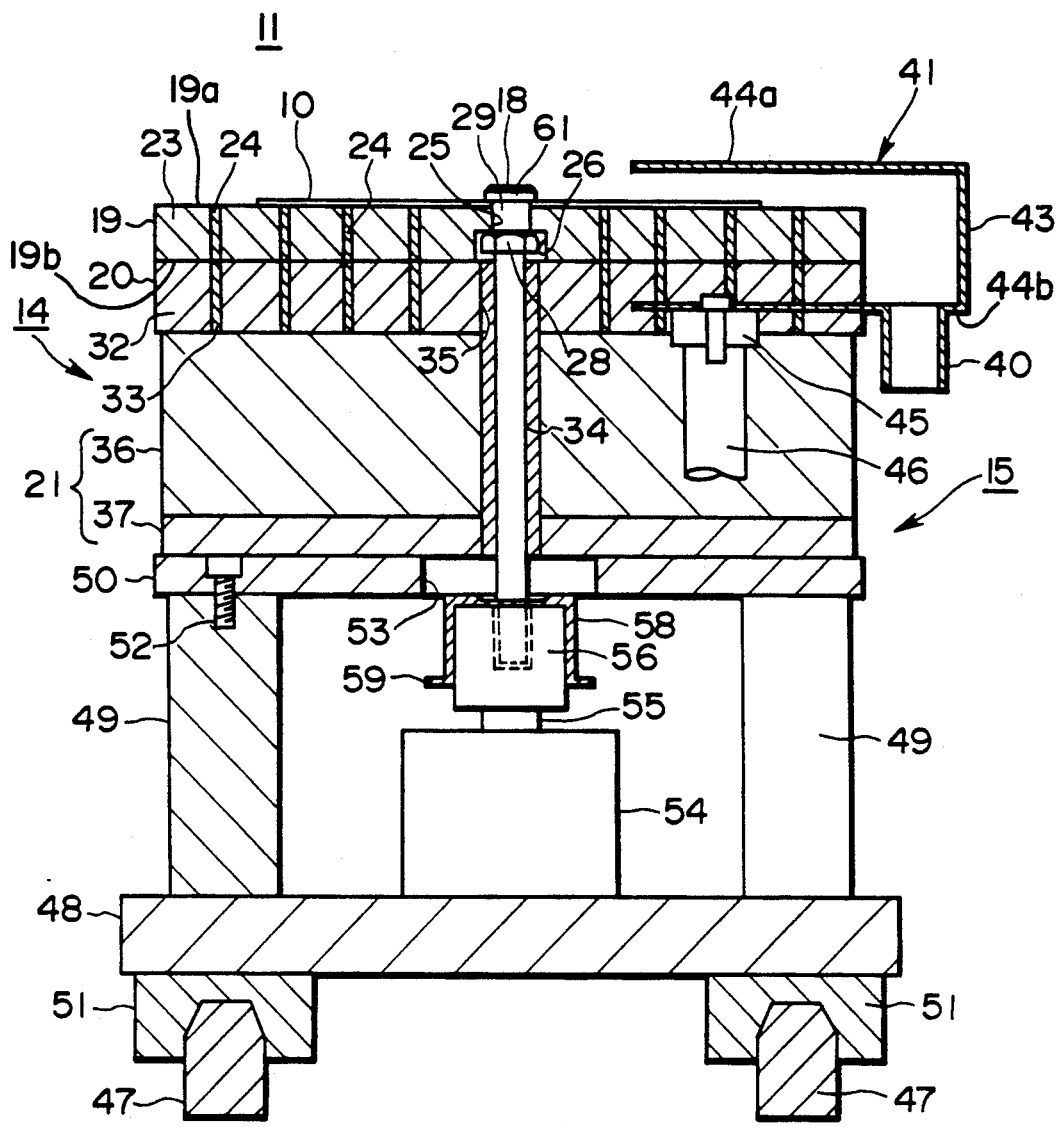

As mainly shown in FIGS. 2 to 4, the transfer unit 11 is comprised of the stamper 10, on the surface of which a pattern of fine projections and valleys are formed, a stamper holding unit 14 for holding the stamper 10, a movable table 15 for shifting the stamper holding unit 14 to a predetermined site, and a centering pin 18 for peeling the disc base plate, on which the pattern of fine projections and valleys on the stamper 10 has been transferred by photocuring of the UV curable resin, from the stamper 10.

The stamper 10 is formed of nickel in the shape of a disc and has on its one major surface 10a a pattern of pits or grooves of fine projections and valleys consistent with the recording information. A reverse major surface 10b opposite to the major surface 10a is a highly smooth flat surface to be placed on a resting surface 19a of a magnet adapter 19 which will be explained subsequently. A centering through-hole 22, extending along the plate thickness, is formed at the middle of the stamper 10 so as to be used as a positioning hole for the magnet adapter 19.

The stamper holding unit 14 is comprised of a magnet adapter 19 for placing the stamper 10 thereon, a magnet chuck 20 for magnetically attracting and securing the magnet adapter 19, and a holder 21 for holding magnet adapter 19 and the magnet chuck 20.

The magnet adapter 19 is adapted for placing the stamper 10 thereon and is formed as a flat plate constituted by magnetic sections 23 of a ferromagnetic material and separators 24 formed of a material of low magnetic permeability which are arranged alternately with and extended in the same direction as the magnetic sections 23. Since the magnet adapter 19 is adapted for placing the stamper 10 thereon, the resting surface 19a for placing the stamper 10 thereon is designed as an extremely smooth flat surface. The magnet adapter 19 is formed with a central positioning through-hole 25 which is extended along the plate thickness and through which is passed a mounting ring 27 adapted for securing the stamper 10 at a predetermined position on the magnet adapter 19, as will be explained subsequently. On reverse surface 19b, opposite to the resting surface 19a adapted for placing the stamper 10 thereon, a recess or blind hole 26 for accommodating a nut 28 used for securing the mounting ring 27 to the magnet adapter 19 is formed at a site in register with the positioning hole 25. The recess 26 has a diameter larger than the outer profile of the nut 28, so that, when the nut 28 is placed within the recess 26, the nut is completely accommodated within the magnet adapter 19.

In actual practice a set of magnet adapters 19 is provided so that single adapter 19 best suited to the type of the stamper 10 may be employed. For example, since the outer diameter of the stamper, the size of the centering hole etc. of an optical disc and that of a magneto-optical disc differ from each other, while also differing with different types of the optical discs on magneto-optical discs, it is necessary to provide a variety of magnet adapters 19 suited to these various disc types.

Figure 5:
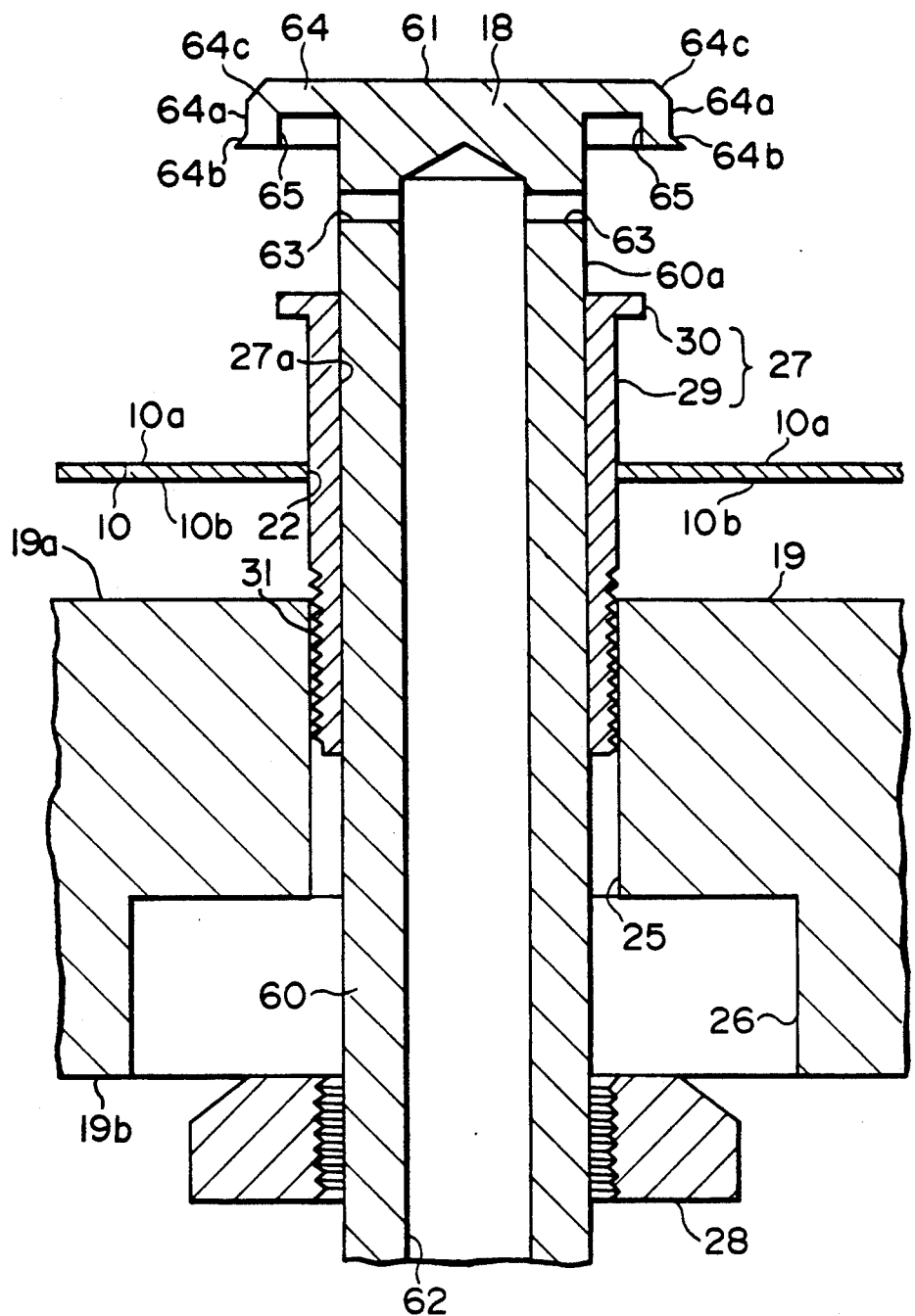

Referring to FIG. 5, the mounting ring 27 is formed integrally by a cylindrical section 29 introduced through the centering hole 22 in the stamper 10 and the positioning hole 25 in the magnet adapter 19 and by a flange-shaped stamper retainer 30 which is projected slightly outwards from the upper end of the cylindrical section 29.

The cylindrical section 29 is used for positioning the stamper 10 with respect to the magnet 19. The outer diameter of the tubular section 29 is substantially of the same diameter as the centering hole 22 of the stamper 10 and the positioning hole 25 of the magnet adapter 19. Thus, with the cylindrical section 29 being introduced through the centering hole 22 of the stamper 10 and through the positioning hole 25 of the magnet adapter 19, the relative position is set and the stamper 10 is positioned with respect to the magnet adapter 19. A male threaded part 31 meshing with the nut 28 is formed on the outer peripheral surface near the lower end of the cylindrical section 29 for reliably securing the mounting ring 27 to the magnet adapter 19. A centering pin 18, which will be explained subsequently, passed through an axial through-hole 27a formed in the mounting ring 27.

The stamper retainer 30 is used for securing the stamper 10 to the magnet adapter 19 and for retaining the rim of the centering hole 22 of the stamper 10. The diameter of the stamper retainer 30 is of such a size as not to reach the pattern of projections and valleys formed on the major surface 10a of the stamper 10.

Figure 8:
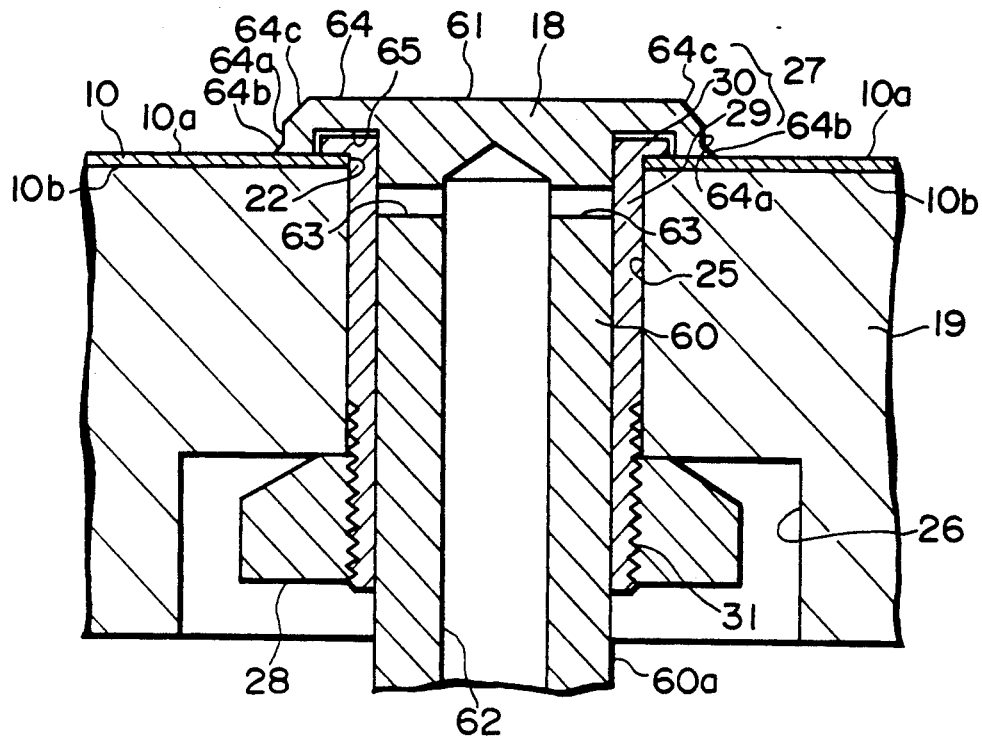

Thus, when the nut 28 is engaged with the male threaded part 31 of the mounting ring 27, which is passed through the centering hole 22 of the stamper 10 and the positioning hole 25 of the magnet adapter 19 and which is protruded into the recess 26, the mounting ring 27 is secured to the magnet adapter 19, as shown in FIG. 8. Simultaneously, the rim of the centering hole 22 in the stamper 10 is positioned between the stamper retainer 30 of the mounting ring 27 and the resting surface 19a of the magnet adapter 19 for securing the stamper 10 to the magnet adapter 19.

The magnet chuck 20 is adapted for securing the magnet adapter 19, which is exchanged with another magnet adapter depending on the types of the stamper 10, by magnetic attraction, and is formed as a flat plate constituted by magnetic sections 32 of a ferromagnetic material and separators 33 of a low magnetic permeability material which are arranged alternately with and extended in the same direction as the magnetic sections 23, similarly to the magnet adapter 19. It is noted that the magnetic chuck 20 and the magnet adapter 19 are superposed one upon the other, with the magnetic sections 23, 32 or the separators 24, 33 being of the same width and extended in the same direction so as to be in register with one another.

The magnet chuck 20 is formed with a guide sleeve securing through-hole 35 at a position in register with the positioning hole 25 of the magnet adapter 19, wherein a guide sleeve 34 for guiding the centering pin 18 as later described is introduced under pressure into and secured to the through-hole 35. The guide sleeve 34 is formed of a synthetic resin or the like as a tube and has an axial through-hole 34a (FIG. 2) into which the centering pin 18 is introduced. The centering pin 18 is slid within the guide sleeve 34 with the inner peripheral surface of the centering hole 34 as a slide guide.

With the above described magnetic chuck 20, an intensive electro-magnetic attraction is generated when a predetermined electrical current is caused to flow through a section adapted for generating magnetic lines of force, not shown, annexed to the magnetic chuck 20. Thus, when a predetermined current is caused to flow through the section for generating magnetic lines of force, the magnet adapter 19 is magnetically attracted and secured to the magnet chuck 20, while the stamper 10 secured to the magnet adapter 19 is also magnetically attracted to follow the flat resting surface 19a of the magnet adapter 19 to realize a high degree of planarity.

The holder 21 holds the magnet adapter 19 and the magnet chuck 20 and is made up of a flat-plate-shaped holder 36 of a thicker plate and a flat-plate-shaped holder 37 of a thinner plate superposed on the holder 36. These holders 36, 37 are formed with through-holes 38, 39 in register with the guide sleeve securing through-hole 35 of the magnet chuck 20. The function of these through-holes is similar to that of the guide sleeve securing through-hole 35 of the magnet chuck 20. The guide sleeve 34 is introduced under pressure into and secured to these through-holes 38, 39. Thus the guide sleeve 34 is passed through the magnet chuck 20 and the two holders 36, 37.

Figure 6:
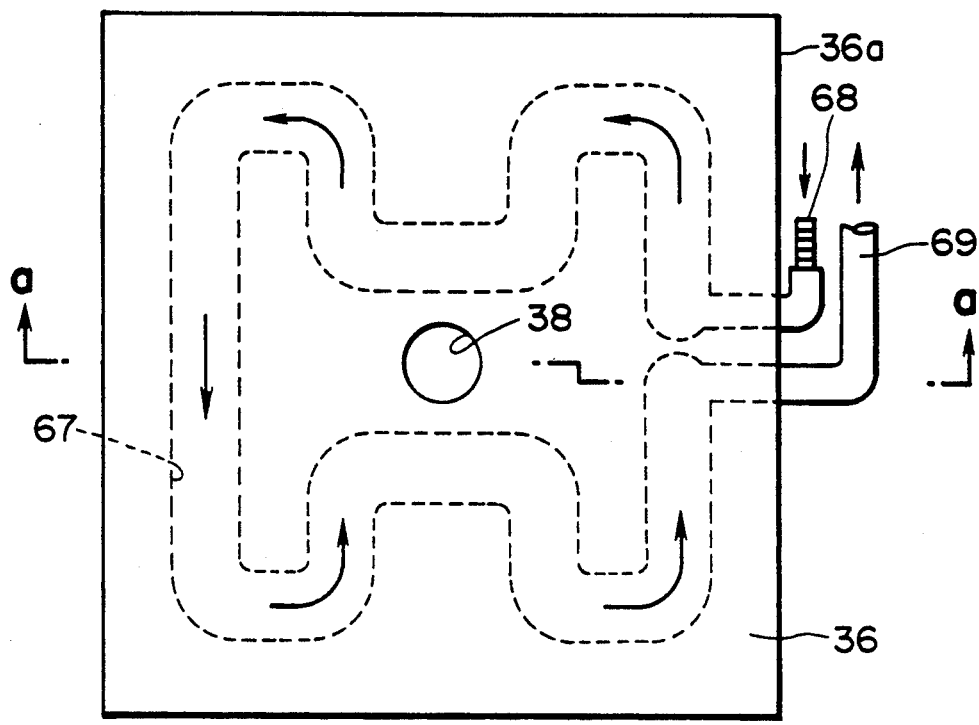
Figure 7:
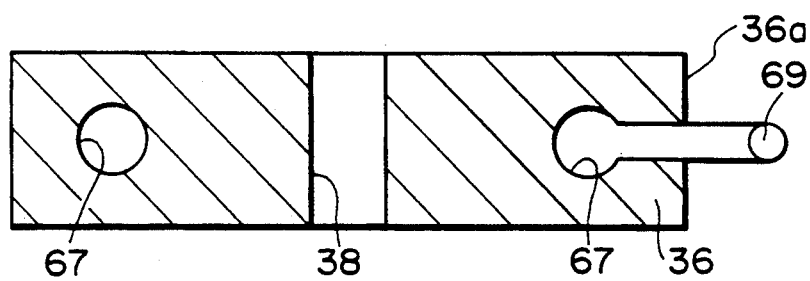

Referring to FIGS. 6 and 7, a pipe 67 used for circulation of hot water is embedded at the middle of the plate thickness of the holder 36 of the thicker plate of the holder 21. The pipe 67 may also be placed for surrounding the perimeter of the holder 36. The pipe 67 is laid so that the holder 36 in its entirety is heated by the hot water flowing therethrough. An inlet 68 duct and an outlet duct 69 for hot water for pipe 67 is attached to a lateral side 36a of the holder 36. Thus the hot water introduced into the inlet duct 38 flows through pipe 67 through the entire holder 36 towards the outlet duct 69, as shown by an arrow in FIG. 6. In this manner, the magnet adapter 19 and the magnet chuck 20 held by the holder 36 are heated by heat conduction of the hot water for perpetually maintaining the stamper 10 secured to the magnet adapter 19 at a constant temperature.

The hot water circulated through pipe 67 is kept at such a temperature at which the pattern of fine projections and valleys of the stamper 10 are satisfactorily transferred to the UV curable resin layer applied on the disc base plate placed on the stamper 10. That is, the temperature is maintained so as to be just high enough to heat the UV curable resin so that its viscosity is suited to effect transfer. The temperature of the hot water is preferably changed to suit the particular UV curable resin since the viscosity suited for transfer varies from one UV curable resin to another. In the present embodiment, the hot water is passed through the pipe 67 so that the temperature of the stamper 10 is perpetually 22° C. to 35° C.

The above described stamper holding unit 14 is provided with a dust removing unit for removing fine dust and dirt of UV cured resin which remain on the stamper 10 after the disc base plate is peeled off from the stamper 10 or air-borne dust and dirt which have become affixed to the stamper 10.

The dust removing unit is made up of a flowing unit, not shown, having a blowout 42 for blowing off dust an dust remaining on the stamper 10 and a dust cover 41 having a discharge port 40 for collecting and forcedly discharging the flown-off dust and dirt.

The blowing unit blows a gas, such as nitrogen or oxygen, towards one major surface 10a of the stamper 10, and has its blowout 42 oriented in the same direction as that of one of the diagonal lines of the magnet adapter 19. The pressure etc. of the gas blown out at the blowout 42 may be adjusted suitably.

The dust cover 41 is used for collecting the blown-off dust and dirt, and is formed integrally by a sidewall 43 surrounding two sides of the magnet adapter 19 to which the blowout 42 is directed, a first hood 44a for covering the resting surface of the magnet adapter 19 and a second hood 44b provided for facing the first hood 44a.

The sidewall 43 is L-shaped for surrounding the two sides of the magnet adapter 19 to which the blowout 42 is directed. The second hood 44b is provided at one end of the sidewall 43. The second hood 44b is provided with a downwardly extending tubular discharge duct 40 at a position in register with the blowout 42. A suction pump, not shown, i s attached to the discharge duct 40 for forcedly drawing dust and dirt. Thus the blown-off dust and dirt are passed through the discharge duct 40 and discharged out of the system to maintain the major surface 10a of the stamper 10 in a clean state at all times.

The first hood 44a has its portion facing the stamper 10 cut off parabolically and is integrally formed with the other end of the sidewall 43 to cover the resting surface 19a of the magnet adapter 19. The first hood 44a has its portion facing the stamper 10 cut off in order to permit the glass base plate coated with the UV curable resin to be placed on the stamper 10.

The above described dust cover 41 is provided on the stamper holding unit 14 by being secured to a base 48 of the movable table 15 by means of columnar supports 46, 46 secured at the distal ends of plates 45, 45 secured in turn to a frame 13. It is to be noted that the dust cover 41 is attached to the stamper holding unit 14 of the dust cover 41 in any other desired manner The movable table 15 is used for moving the stamper holding unit 14 to a desired site and is made up of the base 48 guided along rails 47, 47 and a stamper holding unit mounting block 50 supported on the base 48 by means of four supporting columns 49.

The base 48 is provided with legs 51, 51 slidably engaging with rails 47, 47 mounted parallel to and at a predetermined distance from each other.

The stamper holding unit mounting base 50 is used for supporting and securing the stamper holding unit 14 thereon and is secured by four bolts 52 by means of cylindrical supporting pillars 49 mounted upstandingly at four corners of the base 48. The stamper holding unit mounting base 50 is formed with a through-hole 53 in register with a tap adapter 56 which is introduced into the through-hole 53 as will be explained subsequently.

The above described movable table 15 is moved along the rails 47, 47 to a predetermined site with the stamper holding unit 14 placed thereon.

A pneumatic cylinder 54 for raising and lowering the centering pin 18 as later described is mounted on the base 48 of the movable table 15. The above mentioned tap adapter 56 for interconnecting the centering pin 18 and the pneumatic cylinder 54 is secured to the distal end of a piston rod 55 of the pneumatic cylinder 54.

The tap adapter 56 is provided with a locking unit which, when the lower end of the centering pin 18 is inserted into an upwardly opened hole 57, permits the pin 18 to be moved in the inserting direction but not in the extracting direction. Unlocking may be achieved easily by downwardly pressing an operating piece 59 of an operating member 58 overlying the tap adapter 56.

Figure 9:
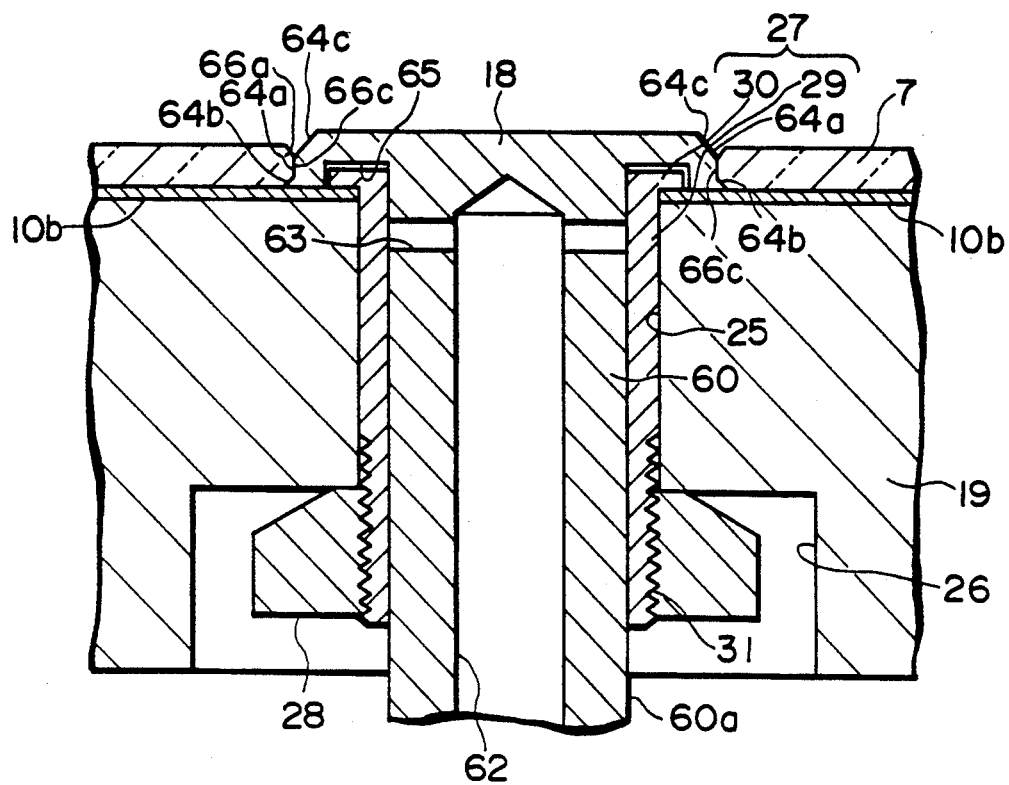
Figure 12:
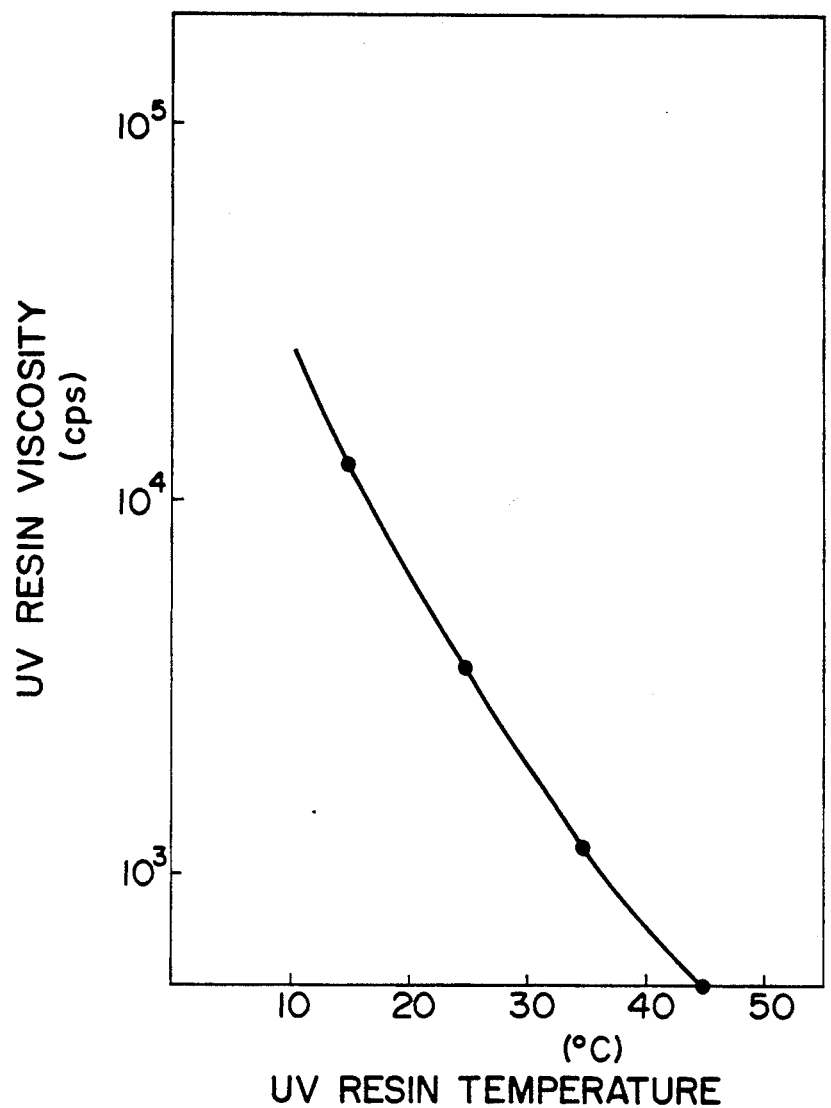
FIG. 12 is a graph showing the relation between the temperature of the a UV curable resin and its viscosity.
Figure 13:
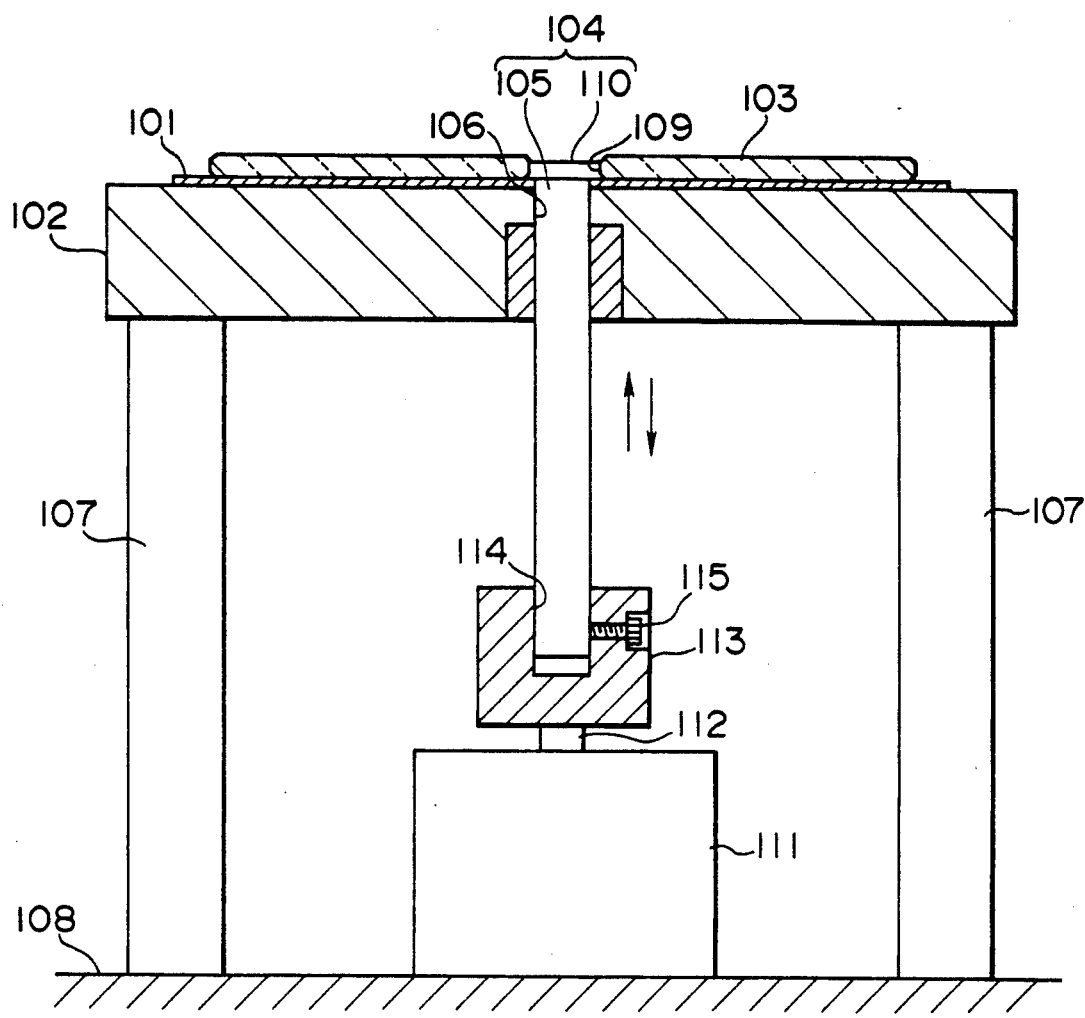
FIG. 13 is a front view showing the state in which the disc base plate is placed on a conventional disc base plate transferring apparatus.

Referring to FIGS. 8 and 9, the centering pin 18 is used for peeling the disc base plate 7, on which the pattern of fine projections and val lays on the stamper 10 has been transferred and cured by photocuring of the UV curable resin, from the stamper 10, and is made up of a cylindrical inlet section 60 connected to the pneumatic cylinder 54 and a positioning section 61 adapted for positioning the disc base plate 7.

The inlet section 60 is a cylindrical pin introduced through a through-hole 27a of the mounting ring 27 and the centering hole 34a of the guide sleeve 34 and adapted to be slid with the inner peripheral surface of the center hole 34a as the guide. The lower end of the inlet section 60 is introduced into and locked by the hole 57 of the tap adapter 56. Thus the centering pin is connected to the pneumatic cylinder 54 by means of the tap adapter 56.

A blind air hole having a substantially circular cross-section is formed axially of the inlet section 60 from the lower end to close to the upper end of the inlet section 60. A gas inlet device, not shown, for introducing a gas, such as air or nitrogen, is adapted to be connected to the air hole 62. A plurality of blowout ports 63 leading from the air hole 62 to outer periphery 60a of the inlet section 60 are formed at a suitable internal from one another on the outer peripheral surface 60a of the inlet section 60. Thus the gas introduced through the air hole 62 is adapted to be blown outwards through the air blowout ports 63. It is noted that the gas is blown out at the air blowout ports 63 in association with the operation of the centering pin 18 in such a manner that the gas is blown out when the centering pin 18 starts to be raised.

The positioning section 61 is used for positioning the disc base plate 7 at a predetermined position of the stamper 10 and is adapted to fit in a centering hole 66 of the disc base plate 7. That is, the positioning section 61 has a flange section 64 extended outwards from the upper end of the inlet section 60, which flange section 64 is engaged with the centering hole 66 in the disc base plate 7 for positioning the disc base plate 7.

The distal end of the flange section 64 is cut obliquely in the form of an inclined surface to permit the disc base plate 7 to be engaged easily with the positioning section 61 of the disc base plate 7, this inclined surface functioning as an inlet part 64c.

The outer periphery of the flange section 64 is formed with a collar 64b adapted for engaging a papered surface 66b on the outer rim of the centering hole 66 in the disc base plate 7 for raising the tapered surface 66b at the time of peeling of the disc base plate 7. The collar 64b is contiguous to the lower end of the positioning section 64b and extended in a flange fashion so as to be reduced in thickness towards its distal end. The collar 66b is intruded below the disc base plate 7 with an inclined surface supporting one taper surface 66b of the centering hole 66 of the disc base plate 7 from below. The surface of the collar 66b facing the stamper functions as a surface pressing the stamper 10.

The surface of the flange section 64 facing the stamper retainer 30 of the mounting ring 27 is formed with a toroidal recess 65 the inner end of which is delimited by an outer peripheral surface 60a of the inlet section 60. The recess 65 functions as a clearance for the stamper retainer 30 of the mounting ring 27 and, with the flange section 64 abutting on the stamper 10, accommodates the stamper retainer 30 therein with a small tolerance.

The method for transferring the pattern of fine projections and valleys of the stamper 10 onto the UV curable resin layer applied to one surface of the disc base plate 7, with the use of the above described transfer apparatus 11, is hereinafter explained.

In the first place, a liquid UV curable resin is applied on one surface of the disc base plate 7 transported from the disc base plate supplying section 3 to the UV curable resin supplying section 5 fin FIG. 1. The disc base plate 7 is then placed on the stamper 10 of the transfer unit 11, with the resin coated surface directed downwards. That is, the disc base plate 7 is superposed on the stamper 10 for facing the major surface 10a of the stamper 10 with the UV curable resin in-between.

The disc base plate 7 is a transparent glass base plate or a base plate of a transparent synthetic resin having the centering hole 66, as shown for example in FIG. 9. The upper and lower rim portions of the center hole 66 are chamfered to form tapered surface 66a, 66b. The inner peripheral surface 66c of he centering hole 66 between these tapered surfaces 66a, 66b functions as a positioning surface.

When placing the disc have plate 7 on the stamper 10, the tapered surface 66b of the disc base plate 7 facing the stamper 10 is guided by the inlet part 64c of the centering pin 18, with the positioning surface 66c of the disc base plate 7 engaging with the base plate positioning part 64c of the centering pin 18. The tapered surface 66b of the disc base plate 7 is engaged with the inclined surface of the collar 64b of the centering pin 18 from above. As a result, the disc base plate 7 is accurately positioned at a predetermined position of the stamper 10.

When the disc plate 7 is held by the stamper 10, the movable table 15 is moved along rails 47, 47 and guided to the pressing unit 12. The disc base plate 7 is pressed by the roll etc. towards the stamper 10.

The hot water circulated through pipe 67 provided in the holder 36 releases its heat to the stamper 10 secured on the magnet adapter 10 by means of the holder 36. Thus the liquid UV curable resin lying between the disc base plate 7 and the stamper 10 is heated by the heat released from the stamper 10 until its viscosity is suited for transfer. Thus the UV curable resin is intruded uniformly into interstices between the fine projections and val lays on the major surface 10a of the stamper 10 so as to be charged uniformly between the stamper 10 and the disc base plate 7.

The movable table 15 is further moved forwards along rails 47, 47 as far as the UV ray irradiating unit 13. The UV rays are irradiated from the disc base plate side for curing the liquid UV curable resin. The hot water is circulated until curing of the UV curable resin is completed.

When the UV curable resin is cured completely, the movable table 15 is guided along rails 47, 47 to its original position, that is the position at which the disc base plate 7 was placed on the stamper 10. At this time, the disc base plate 7 is peeled off from the stamper 10, simultaneously with the UV cured resin layer, not shown.

The disc base plate 7 is peeled from the stamper 10 in the following manner.

In the first place, the pneumatic cylinder 54 is driven for raising the piston rod 55. The centering pin 18 is guided by the guide sleeve 34 and the mounting ring 27 and raised by means of the tap adapter 56 secured to the distal end of the piston rod 55.

Since the tapered surface 64b of the disc base plate 7 is engaged at this time on the inclined surface of the collar 64b of the centering pin 18 from above, the disc base plate 7 is raised at its middle portion simultaneously with the UV cured resin layer. Clean air is discharged from the air blowout ports 63 of the centering pin 18 in association operatively with the raising of the centering pin 18, as shown in FIG. 10. It is noted that the discharged gas may also be nitrogen etc. in place of clean air. The discharged gas need not be pressurized positively and may be at a pressure slightly higher than negative pressure. For example, the gas pressure may be of an order of 0.2 to 0.3 kg/cm².

This causes the negative pressure between the disc base plate 7 and the stamper 10 to be decreased to avoid the status of vacuum. As a result, the disc base plate 7 may be unforcedly peeled off from the stamper 10. There is no risk of the UV cured resin on the disc base plate 7 being left on the stamper Since the disc base plate 7 may be unforcedly peeled off by air flow, there is no risk of destroying the disc base plate Then, a nitrogen gas etc. is ejected towards the major surface 10a of the stamper 10 from which the disc base plate 7 has been peeled to blow off fine particles of the UV cured resin remaining on the major surface 10a of the stamper 10 or air-borne dust and dirt which has become affixed to the stamper 10. The blown-off particles or dust and dirt are blown toward the discharge port 40 provided in the dust cover 41 so as to be discharged out of the system.

As a result, the stamper 10 is freed of dust and dirt and maintained in the clean state. In this manner, the stamper 10 may be prevented from damage and is extended in service life, while the duplication yielded rate of the disc base plate may be improved.

What is claimed is:

1. An optical recording medium manufacturing apparatus comprising:
   a metal stamper having formed on one flat surface thereof a pattern of convex and concave shapes representative of information signals;
   holding means having a flat surface and for holding the stamper on the flat surface at a constant temperature;
   coating means for applying a UV curable resin as a coating on one surface of a transparent substrate;
   tight pressing means for tightly pressing the surface of the substrate coated with the UV curable resin onto the stamper while maintaining the stamper at the constant temperature which is sufficient to maintain the UV curable resin at a temperature at which the UV curable resin uniformly flows into the pattern of concave and convex shapes on the surface of the stamper;
   means for UV ray irradiating the UV curable resin tightly pressed onto the stamper to fix the UV curable resin; and
   means for separating the fixed UV usable resin on the substrate from the stamper.

2. The optical recording medium manufacturing apparatus according to claim 1, wherein a constant temperature maintaining means is provided within the holding means and the UV curable resin coating applied by the coating means is maintained by the constant temperature maintaining means at a viscosity suited to transfer to the UV curable resin coating the pattern of concave and convex shapes on the stamper.

3. The optical recording meidum manufacturing apparatus according to claim 2, wherein the constant temperature maintaining means is a circulating mechanism for circulating warm water to transfer heat to the holding means.

4. An optical recording medium manufacturing method using a stamper having formed on one flat surface thereof a pattern of concave and convex shapes representative of information signals and made of metal material, which comprises the steps of:
   applying a UV curable resin on one surface of a transparent substrate;
   tightly pressing the surface of the substrate coated with the UV curable resin onto the stamper while maintaining the stamper at a constant temperature which is sufficient to maintain the UV curable resin at a temperature at which the UV curable resin uniformly flows into the pattern of concave and convex shapes on the surface of the stamper;
   UV ray irradiating the UV curable resin tightly pressed onto the stamper to fix the UV curable resin; and
   separating the fixed UV curable resin on the substrate from the stamper.

5. A transfer apparatus for making a recording disk comprising:
- coating means for applying a UV curable resin on a disk base plate;
- holding means for holding a metal stamper on which a pattern of projections and valleys based on information signals is formed;
- tight pressing means for tightly pressing the disk base plate coated with the UV curable resin onto the stamper;
- constant temperature maintaining means applied to the holding means for maintaining the stamper at a constant temperature sufficient to cause the UV curable resin to uniformly flow into the pattern of projections and valleys on the stamper; and
- UV ray irradiating means for fixing the UV curable resin tightly pressed onto the stamper.

6. The transfer apparatus according to claim 5, wherein the constant temperature maintaining means is provided within the holding means.

7. The transfer apparatus according to claim 6, wherein the constant temperature maintaining means is a circulating mechanism for circulating warm water.

* * * * *